July 21, 1970            H. JÖRG            3,521,504
GEAR HOUSING
Filed July 19, 1968
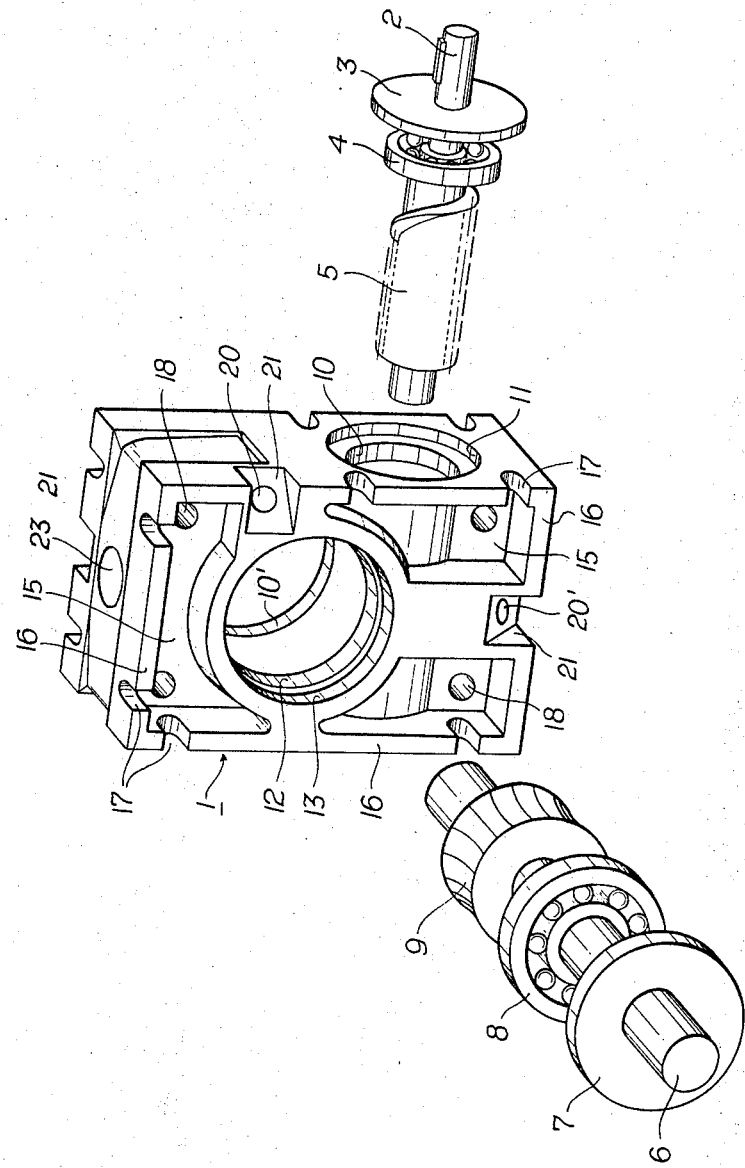
INVENTOR
HELMUT JÖRG
BY Woodhams, Blanchard & Flynn
ATTORNEYS United States Patent Office 3,521,504
Patented July 21, 1970

3,521,504
GEAR HOUSING
Helmut Jörg, 8/3 Anton Frankgasse,
A-1180 Vienna, Austria
Filed July 19, 1968, Ser. No. 746,224
Int. Cl. F16h 57/02, 57/04
U.S. Cl. 74—606                                5 Claims

ABSTRACT OF THE DISCLOSURE

A gear housing having bores therein in which antifriction bearings are mounted to support two shafts, one of which has a worm gear mounted thereon and the other of which has a worm mounted thereon. The bores are constructed so that the antifriction bearings are directly seated therein.

---

The invention relates to a housing for a gear, for example of the worm, spur wheel or bevel wheel types as used for connecting the shaft of a driving motor or engine to the input shaft of the appliance to be driven, with simultaneous speed reduction or change in the position or direction of the drive axis, and in which antifriction bearings are provided for the mounting of all the gear shafts.

The usual housing of such gears consist of two shell halves or of a box-shaped part having a cover or insert piece, the second shell half, the cover or the insert piece not being placed in position until the gear parts have been fitted, and the gear housing being then closed by screwing or bolting fast the second shell half, cover or insert piece. These parts which complete the housing carry the bearing sets necessary for the operation of the gear, which bearing sets are arranged opposite the bearing sets located in the housing. In this known bearing housing, it is disadvantageous that the seating surfaces of the two shell halves or of the cover have to be machined and sealed, or that these parts have to be centered on each other by fitting edges, fitting dowels, screws and the like, which requires a fairly considerably expenditure of labor, and nevertheless, in the event of overloading of the gear, may readily result in displacement of the interconnected parts or to leakiness of the housing.

The invention provides a gear housing of the above-mentioned kind, which obviates these disadvantages. This is achieved according to the invention in that each housing bore provided for the introduction of a gearwheel (spur wheel, bevel wheel, worm wheel, worm) is constructed as direct seating for the antifriction bearing serving for the mounting of the respective shaft.

The reasons why hitherto there has been some hesitation in mounting all the shafts, especially also the worm wheel of worm gears, directly in the housing, is that relatively large and therefore expensive antifriction bearings are necessary for this purpose. This applies at least to the one side from which the worm wheel is mounted in the housing. At this place, of course, the housing bore must be larger than the worm wheel, this also resulting in a correspondingly large antifriction bearing.

The inventor has recognized that it is much more advantageous to accept a large antifriction bearing than to use separtae insert pieces or a cover for closing the necessary bores, because machining, and particularly also sealing, is thereby much simpler, whereby despite the acceptance of a larger antifriction bearing, the overall costs are reduced and the operational reliability is increased. Not only does the observance of definite tolerances in machining the housing in relation to the associated cover, and vice versa, become unnecessary, but so does the mounting of the cover by means of screws. The antifriction bearings may be simply fitted and a sealing ring mounted in position, which simplifies considerably the entire assembly operation.

According to a preferred embodiment, the arrangement is such that all the plain bores of the housing, each of which is associatied with a gear shaft and serves as seating for an antifriction bearing, are stepped in their diameters downward in one direction, such that they may be machined in one operation by means of a multiple tool, and the shafts provided with bearings and gear elements may be mounted by means of a single pressing operation.

An embodiment example of the subject of the invention is described more particularly in the following with reference to the accompanying drawing, showing in perspective a gear housing and two gear parts to be mounted therein.

The gear housing referred to be 1 as a whole, consists of a single hollow casting. The driving shaft 2 to be mounted therein and to be coupled to the motor or engine carries a sealing disc 3, a ball bearing 4 and a worm 5. The second gear shaft 6 to be mounted also carries a sealing disc 7, a ball bearing 8 and the worm wheel 9 to be brought into engagement with the worm. (The parts 3, 4, 5 and 7, 8, 9 are shown spaced apart for the sake of clarity, although in reality they are immediately adjacent each other.)

The gear housing 1 is provided with bores, perpendicular to each other, for the introduction of the aforesaid gear parts, which bores are stepped in one direction, so that insertion of the gear parts is possible by simple pressing from one side. The inner end of the gear shaft 2 enters a ball bearing mounted on the wall opposite the introduction opening. The ball bearing 4 is seated in the bore 10 and the sealing disc 3 is seated in the recess 11 of the housing 1. In just the same way, the inner end of the gear shaft 6 is seated in a ball bearing, not shown, inserted in the recess 10' of the housing 1. The ball bearing 8 comes on the annular surface 12, and the sealing ring 7 in the recess 13 of the respective housing bore. By means of this construction, assembly of the gear elements to be introduced is effected by means of a single pressing operation, and the machining of the seating surface for the bearings may also be carried out in a single working operation by means of a suitably shaped multiple tool, which represents a considerable reduction in labor costs when a series of such gear housings is to be made.

The gear housing is furthermore so constructed that it may be connected by any of the boundary surfaces of its prismatic shape to the motor or to the housing of the appliance to be connected thereto. For this purpose, depressions 15 are provided on the front and back, the said depressions being bounded outwardly by flange-like projecting edges 16 relative to the sides. Slots 17, open at one end, are provided in these flange-like projecting edges, and serve for the introduction of screwbolts for fixing, depending on whether this fixing is to be carried out on the boundary surfaces situated at the top and bottom or left and right in the drawing. Furthermore, bores 18 running parallel to the gear shaft 6 are provided for fixing to the front and back.

Since the gear housing may thus be mounted in any desired position, suitable arrangements must also be provided for replenishing the lubricant or for venting the housing in the event of heating during operation. This purpose is served by the bores 20, 20' extending in a diagonal direction and terminating in corresponding recesses 21 of the housing edges. Each such bore, closable by a screw or the like, is provided on the horizontal lower front edge and on the front right-hand edge and on the rear left-hand edge, that is to say, on diametrically opposite edges, but in positions offset relative to each other in the longitudinal direction of the edges. In this method of providing these bores, in each mounting position of the housing, one of the said bores 20 or 20′ lies at the top and may be used for replenishing the lubricant, while a second bore lies always at the lowest part of the gear and hence serves for discharging the lubricant.

For permitting at any time inspection of the level of the lubricant supplied, or the degree of wear of the gear wheels contained in the housing, there are provided on at least two boundary surfaces of the housing perpendicular to each other glazed inspection orifices 23, one only of which, situated on the top boundary surface, is visible in the drawing. The axes of these inspection orifices 23 are directed to the inwardly situated toothed gear parts, so that their state of wear may be inspected.

The embodiments of the invention in which an exclusive property or privilege is claimed are defined as follows:

1. A gear housing comprising a single hollow casting having a plurality of bores therein in which gear shafts are to be rotatably mounted in antifriction bearings, said bores being formed to permit the introduction of a gear, each of said bores including means for providing a direct seating for said antifriction bearing serving to rotatably mount the respective shaft.

2. A gear housing according to claim 1, wherein each of said bores associated with a gear shaft and having said means providing a seating for an antifriction bearing, is stepped in its diameter downwardly in one direction, such that it is machinable by means of a multiple tool in a single working operation, and the shafts provided with antifriction bearings and gear elements may be mounted in said bores by a single pressing operation.

3. A gear housing according to claim 2, wherein said gear shafts each have a sealing disk, an antifriction bearing and a gear element mounted thereon, the gear element on one of said shafts mounted in meshing engagement with the gear element on the other of said shafts, the antifriction bearings on said shafts being received in said bores and seated on said seating means provided therefor, said sealing disks being provided to cover said bores to enclose said gears within said housing.

4. A gear housing according to claim 1, wherein said gear housing further comprises six boundary surfaces, each perpendicular to its neighbor and having recesses on two oppositely situated boundary surfaces, which recesses are bounded at the edges of the respective surface by flange-like projecting edge parts, wherein the flange-like projecting edge parts are formed with slots open at one end for the introduction of fixing screws, and wherein the housing has at least two through openings the longitudinal directions of which are perpendicular to the two said boundary surfaces situated opposite to each other.

5. A power transmission unit, comprising a one-piece, hollow gear housing formed of a single casting and having a pair of parallel spaced apart sidewalls and a pair of parallel spaced apart end walls extending between the sidewalls and being arranged substantially perpendicular thereto, said side and end walls defining the sides and ends of an internal enlarged chamber, said sidewalls having a first bore therethrough and an enlarged recess in one sidewall outside of one end of said first bore, the ends of said first bore communicating with said chamber and said one end of said first bore being at least as large in size as the other end thereof; a first shaft having an extension received in the other end of said first bore and rotatably supported in a bearing mounted in said other end of said first bore, a first gear mounted on said first shaft and positioned in said chamber, a bearing mounted on said first shaft and received within said one end of said first bore and a first sealing device mounted on said first shaft and received in said recess, said first shaft, the first gear and the bearing being of smaller size than said one end of said first bore and being slideable as a unit through said one end of said first bore; said end walls having a second bore therethrough and a second enlarged recess in one end wall outside of one end of said second bore, the ends of said second bore communicating with said chamber at a position laterally offset from said first bore, said one end of said second bore being at least as large in size as the other end thereof; a second shaft having an extension received in the other end of said second bore and rotatably supported in a bearing mounted in said other end of said second bore, a second gear mounted on said second shaft and positioned in said chamber in mesh with said first gear, a bearing mounted on said second shaft and received within said one end of said second bore and a second sealing device mounted on said second shaft and received in said second recess, said second shaft, second gear and the bearing being of smaller size than said one end of said second bore and being slideable as a unit through said one end of said second bore.

References Cited

UNITED STATES PATENTS

| 2,734,393 | 2/1956 | Luenberger | 74—606 XR |
| 2,989,995 | 6/1961 | Happe. | |
| 3,001,409 | 9/1961 | Von Fumetti | 74—606 XR |

ROBERT A. O'LEARY, Primary Examiner

F. D. SHOEMAKER, Assistant Examiner